United States Patent
Barbieri et al.

(10) Patent No.: US 7,890,331 B2
(45) Date of Patent: Feb. 15, 2011

(54) SYSTEM AND METHOD FOR GENERATING AUDIO-VISUAL SUMMARIES FOR AUDIO-VISUAL PROGRAM CONTENT

(75) Inventors: Mauro Barbieri, Eindhoven (NL); Gerhardus Engbertus Mekenkamp, Valkenswaard (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1077 days.

(21) Appl. No.: 10/557,684

(22) PCT Filed: May 17, 2004

(86) PCT No.: PCT/IB2004/050714
§ 371 (c)(1),
(2), (4) Date: Jan. 5, 2007

(87) PCT Pub. No.: WO2004/105035
PCT Pub. Date: Dec. 2, 2004

(65) Prior Publication Data
US 2007/0171303 A1    Jul. 26, 2007

(30) Foreign Application Priority Data
May 26, 2003  (EP)  ................................. 03101522

(51) Int. Cl.
*G10L 11/00*    (2006.01)
*G10L 13/00*    (2006.01)

(52) U.S. Cl. ................ 704/270; 704/258; 386/52
(58) Field of Classification Search .............. None
See application file for complete search history.

(56) References Cited

U.S. PATENT DOCUMENTS

| | | | | |
|---|---|---|---|---|
| 5,805,733 | A  * | 9/1998 | Wang et al. ............... | 382/232 |
| 6,507,841 | B2 * | 1/2003 | Rivierieulx de Varax ....... | 707/5 |
| 6,714,909 | B1 * | 3/2004 | Gibbon et al. ............ | 704/246 |
| 6,751,776 | B1 * | 6/2004 | Gong ..................... | 715/203 |
| 7,181,757 | B1 * | 2/2007 | Kim et al. ............... | 725/61 |
| 2002/0051077 | A1* | 5/2002 | Liou et al. ............. | 348/465 |
| 2003/0233929 | A1* | 12/2003 | Agnihotri .............. | 84/609 |

FOREIGN PATENT DOCUMENTS
JP    2000020744    1/2000

* cited by examiner

*Primary Examiner*—Brian L Albertalli

(57) ABSTRACT

The invention describes a system (1) for generating audio-visual summaries for audio-visual program content (3). The system comprises a search unit (4) for locating a pre-generated text summary (5;) associated with the program content (3); a speech synthesizer (6) for converting the text summary (5,) into speech (7); a video 5 summary generator (8) for generating a video summary (9) of the audio-visual program content (3), and an audio/video mixer (10) for mixing the synthesized speech (7) with the video summary (9). Moreover the invention describes an appropriate method for generating audio-visual summaries (5*i*) for audio-visual program content (3).

11 Claims, 1 Drawing Sheet

Figure 1:
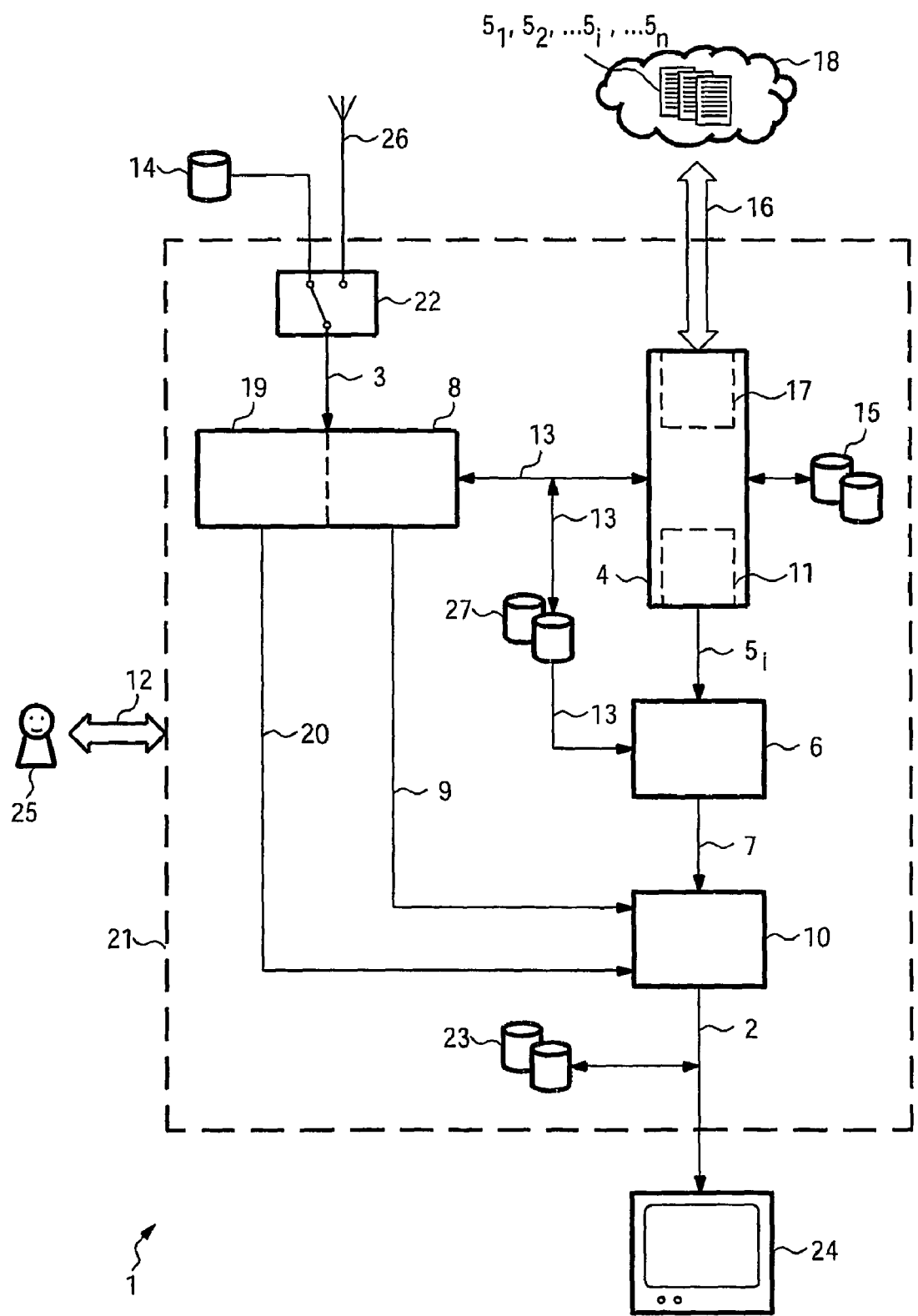

SYSTEM AND METHOD FOR GENERATING AUDIO-VISUAL SUMMARIES FOR AUDIO-VISUAL PROGRAM CONTENT

This invention relates in general to a system and method for generating audio-visual summaries for audio-visual program content, and, in particular, to a system and method for providing audio-visual summary generation in an audio-visual device.

Emerging services such as video-on-demand, pay-TV and on-line multimedia content present the viewer with a multitude of available programs, while new advances in DVD technology and hard-disk recording systems offer the viewer the means to easily record TV programs and to compile his own collection of films. With the advent of digital TV and the increase in available channels, the viewer will be faced with an even greater choice of programs to watch. It will then be even more desirable to record programs on video or DVD for viewing at a later stage, particularly when programs are broadcast at an unsuitable time for the viewer or when several programs are broadcast simultaneously on different channels.

As the collection of recorded programs grows, it becomes increasingly difficult to locate a specific program for viewing. Quite often, the name of the recording alone will not suffice to inform the viewer as to its nature and contents, and it is generally not practicable to view a segment of each recording to see if it is the desired one. Locating the desired recording would be made easier by a collection of summaries which offers enough information about each recording to allow the user to make an informed choice.

There are techniques available to generate summaries using the audio and video contents of the audio-visual stream, which can originate from, for example, a television broadcast or an audio-visual device such as a DVD player, VCR, etc. The audio content of the audio-visual signal may contain music, sound effects and other audio contents along with the speech content. US 2002/0051077 A1 for example analyses the closed caption text to find summary sentences for stories in the video content, which can be used to locate the corresponding audio and video clips. The clips can be ordered to give a summary of the program content. Picking video clips to use in a summary is relatively easy but using the accompanying audio content is often undesirable, since the resulting cutting off of background music and/or sound effects has a jarring effect and the results can be irritating to listen to. Cutting off the audio dialog in mid-sentences is quite unacceptable, since the dialog is rendered incomprehensible. Furthermore, the dialog accompanying the video clips may not suffice to give the viewer an idea of what the film is actually about, and will probably not give any information as to the actors in the film, the producer, year of production, film genre, rating, budget, box-office success, number of Oscar nominations, suitability for a particular age-group etc. However, this might be the very information of interest to the viewer when selecting a recording to view. The techniques currently available to the generation of summaries using both audio and video contents of an audio-visual input are therefore generally unsatisfactory, since it is not possible to assemble the information, relevant to the film and crucial to the viewer for making an informed choice, from the audio and video contents.

Therefore, an object of the present invention is to provide a system and a method which can be used to easily generate concise and informative summaries for audio-visual programs.

To this end, the present invention provides a system for generating audio-visual summaries for audio-visual program content, wherein the system comprises a search unit for locating a pre-generated text summary associated with the program content, a speech synthesizer for converting the text summary into speech, a video summary generator for generating a video summary of the audio-visual program content, and an audio/video mixer for mixing the synthesized speech with the video summary.

An appropriate method for generating audio-visual summaries for audio-visual program content comprises locating a pre-generated text summary associated with the program content, synthesizing the text summary into speech, generating a video summary of the audio-visual program content, and mixing the synthesized speech with the video summary.

The system thus provides an easy way of generating an informative summary for an audio-visual program which can be used by the viewer who is presented with all the necessary information to make an intelligent viewing choice within a short time.

The modules which locate text summaries, perform speech synthesis and generate video summaries can be realised by one skilled in the art by using off-the-shelf components. These modules may also be realised using available software and/or hardware components, so that the invention can be realised in a cost-effective manner.

The source of information searched for text summaries relating to the program content might be, for example, an information database, the internet, an intranet, or a digital broadcast signal.

The dependent claims and the subsequent description disclose particularly advantageous embodiments and features of the invention.

Generally, more than one text summary for a particular film will be located by the search unit, unless the search unit is configured otherwise, for example, it might be configured so that it simply takes the first located summary. To allow for choosing the most suitable one of a plurality of located text summaries, the system preferably comprises a selector, which examines each summary and chooses one which most closely satisfies pre-defined criteria.

Criteria for choosing an appropriate summary might be the amount of information contained in the summary text, and the length of time required to present the summary as synthesized speech. For example, it might suffice to mention the title of the film, the names of the starring actors, a brief description of the film, and the film ratings. This summary text could be synthesized and presented as a trailer, along with video clips and background music and/or sound effects extracted from the audio content, in a short length of time, which might suit a viewer who wishes to make a quick choice on the basis of a minimal amount of information. On the other hand, the viewer might wish to be informed in more detail, so that more information about the film's contents, along with information about the film background, all main actors, producer, director, film prize nominations etc., should also be present in the summary text. This information can be synthesized and presented with a larger selection of video clips, perhaps accompanied by sound effects and music extracted from the audio content, to give a very informative trailer for the recording.

The quality of the synthesized summary text might also be controlled by the user, who could specify a voice profile to use in the speech synthesis. The viewer might wish, for example, to have his own voice profile applied to the synthesis, or might prefer a voice profile to match that of the principal actor in the recording.

Therefore, a particularly advantageous embodiment of the invention allows the user to define preferences such as criteria for selecting one of several summaries, for example, desired length of summary, quality of information content etc; and preferences for the synthesis of the summary text into speech. To this end, the system preferably comprises a suitable user interface for entering such preferences.

The type and quality of the existing summaries depend to some extent on the sites in which the summaries are located. Some will be compiled professionally and to a high standard, whereas other reviews might be of a considerably lower standard and therefore unacceptable to the viewer. Therefore, a further advantageous embodiment of the invention allows the user to control the outcome of the search procedure by specifying internet sites which are to be excluded from or included in a search for text summaries. Preferably, the user can enter such search preferences by means of the user interface.

A further embodiment of the invention includes a means of storing the information specified by the user regarding the type and length of text summaries required and the quality of the summaries in a user profile. Advantageously, the system offers the possibility of storing more than one user profile, so that more than one viewer can make use of the system without having to enter user profile information each time.

In a particularly advantageous embodiment of the invention, the system, using the search unit and perhaps also the selector, offers the possibility of collecting pre-generated text summaries and storing these locally in a summary library for future use. The search unit might perform this task in the background, without input being required by the user. Since the summaries are in text format, storing a collection of such summaries will not require a large memory. The user can peruse the collection of text summaries at a later stage, by viewing them on a screen such as a television or computer screen, or in the form of a printout, and decide, on the basis of the information contained in the summary, whether a particular film is worth recording. Should the user decide to record the film, a suitable text has already been earmarked and could very easily be located in and then extracted from the local library and used in generating the trailer for the recording.

In a particularly advantageous embodiment of the invention, the system makes use of a computer network interface to search a computer network for pre-generated text summaries relevant to a particular film. The interface can be realised by means of, for example, a modem, ISDN or DSL connection, and any hardware and software required. A further embodiment of the interface might use a wireless connection to make contact with the computer network. The computer network with which the system makes contact might be a local intranet or the world-wide web (internet). On the internet, for example, there are many sites dedicated to movies, containing general information about all kinds of movies and also reviews and summaries. The search engine can locate these existing summaries, preferably in the language of choice, and download them to the system for further processing. The search engine of the system might also make use of the services of existing, possibly more powerful search engines (for example a meta-crawler) to perform parallel searches, thereby minimising the amount of time required to obtain the desired results. A preferred embodiment of the invention allows the search unit to make contact with a web-based service provider which directly supplies the textual descriptions, so that the system has easy and efficient access to the desired information.

Since the summary for a program content is made more interesting and informative when some of the original soundtrack is included, the invention preferably comprises an audio processor for identifying music and sound-effects on the audio-visual signal, since hearing extracts of the original audio content may be of help to the viewer when choosing a recording to view. Such inclusion of original audio content might be particularly advantageous in the case of, for example, a summary for a musical or a concert recording, so that the viewer can make a more informed choice on the basis of the type of music featured. In the case of a thriller or mystery movie, inclusion of sound-effects copied from the original soundtrack will do much to invoke the atmosphere of the recording. The original speech content could also, if desired, be mixed into the summary in places, perhaps at a volume lower than that of the synthesized summary speech.

A preferred feature of the invention comprises a computer program for performing all the steps involved in locating pre-generated summaries, selecting a suitable summary according to the user preferences, synthesizing the text to speech, generating a video summary and mixing video and audio elements to give a finished summary i.e. most or all of the components of the system, such as search unit, selector, synthesizer, video summary generator could be realised in the form of software modules and implemented on appropriate hardware components. Required software might be encoded on a processor of any media device, such as a TV, VCR, multimedia PC etc., or be encoded on a separate processor, so that an existing media device might be adapted to benefit from the features of this invention.

Other objects and features of the present invention will become apparent from the following detailed descriptions considered in conjunction with the accompanying drawing.

The sole FIGURE, FIG. 1, is a schematic block diagram of a system for automatic summary generation in accordance with an embodiment of the present invention.

In the description of the following FIGURE, which does not exclude other possible realisations of the invention, the system is shown connected to an audio-visual device 24, for example a home entertainment system, TV, multimedia device or similar. For the sake of clarity, an interface 12 between the user 25 and the system 1 has been included only schematically in the diagram. It is understood, however, that the system 1 includes a means of interpreting commands issued by the user 25 in the usual manner of a user interface and may also include a means for outputting the audio-visual signal, for example, TV loudspeakers, TV screen etc.

FIG. 1 shows an automatic summary generation system 1 in which a search unit 4 locates pre-generated text summaries $5_1, 5_2, \ldots 5_i, \ldots 5_n$ associated to a program content 3 in an external computer network 18, for example, the internet.

The program content 3 might originate from a recording 14 on, for example, a video or DVD, or might be received as a television broadcast 26. A switch 22 allows selection of the source of the program content 3. Information relating to the program content 3, entered by the user 25 through a user interface 12 or extracted from closed caption information accompanying the program content 3, is passed to the search unit 4.

The search unit 4 uses this information to see if a suitable summary has already been stored in a local text summary library 15. Alternatively an internet search engine 17 which is part of the search unit 4 might locate relevant pre-generated summaries $5_1, 5_2, \ldots 5_i, \ldots 5_n$ in the internet 18 and download them via the computer network interface 16. In the event of more than one suitable text summary $5_1, 5_2, \ldots 5_i, \ldots 5_n$ being located on the internet 18, a selector 11 of the search unit 4 decides which one most closely satisfies pre-defined criteria, entered by the user 25 via the user interface 12 and stored locally in a memory 27 along with other user preferences 13. On the basis of these criteria, a summary $5_i$ is selected and passed on to a synthesis module 6, which converts the digital text summary $5_i$ into speech 7. The synthesis might be controlled by other kinds of user preferences 13, such as which voice profile to be applied to the synthesized voice 7.

Meanwhile, a video summary generator 8 identifies suitable video sequences in the program content 3 and assembles them into a video summary 9, while an audio processor 19 identifies suitable audio contents, for example, sound effects or music, and assembles these into an audio summary 20. The video summary generator 8 and audio processor 19 may comprise one unit or may be realised as separate components.

An audio-video mixer 10 combines the video and audio summaries 9, 20 with the synthesized audio speech 7 to give a finished summary 2 for the program content 3. The summary 2 can be viewed on an audio-visual device 24 such as a TV, computer screen, multimedia device etc, and/or can be stored on a storage medium 23 for example, video tape, DVD, hard-disk, (removable) solid-state memory, etc, for future use.

The system 1 described in this example is shown as a single device 21 which can be, for example, a kind of set-top box connected to an audio-visual device 24. However, all of the additional components described (search unit 4, speech synthesizer 6, video summary generator 8, audio/video mixer 10) might be integrated to present a single device along with the audio-visual device 24, or might be realised as part of a personal computer system which is connected to an audio-visual device 24.

Although the present invention has been disclosed in the form of preferred embodiments and variations thereon, it will be understood that numerous additional modifications and variations could be made thereto without departing from the scope of the invention. For example, the text summaries stored in memory can be updated or replaced as desired by downloading newer summaries from the internet. It might become possible to download from a third-party provider high-quality ready-made video clips associated with the film to be recorded, so that the automatic summary generation system can make use of the most up-to-date video data available. A further application of the invention might be to present customers of video and DVD rentals with a library of short, concise trailers to browse, for example on an audio-visual device at the rental premises or in the form of a video or DVD catalogue for browsing at home, so that the customers can make an informed choice. Another application might be for use in cataloguing a film archive, where thousands of films are stored.

For the sake of clarity, it is to be understood that the use of "a" or "an" throughout this application does not exclude a plurality, and "comprising" does not exclude other steps or elements.

The invention claimed is:

1. A system for generating an audio-visual summary for audio-visual program content, said system comprising: a search unit for locating a pre-generated text summary associated with the program content but not provided with the program content; a speech synthesizer for converting the selected text summary into speech; a video summary generator for generating a video summary of the audio-visual program content; an audio/video mixer for mixing the synthesized speech with the video summary.

2. The system of claim 1, wherein the search unit comprises a selector for selecting according to pre-defined criteria one text summary from the located text summaries, should more than one summary have been located.

3. The system of claim 1, wherein the system comprises a user interface for inputting user preferences.

4. The system according to claim 1, wherein the system comprises a library for storing pre-generated text summaries for future use.

5. The system according to claim 1, containing a computer network interface and a search engine for locating pre-generated text summaries in a computer network.

6. The system according to claim 1, wherein the system comprises an audio processor for identifying audio content of the audio-visual signal suitable for inclusion in the summary.

7. A media device comprising a system according to claim 1.

8. A method for automatically generating audio-visual summaries for audio-visual program content on a multimedia device, which method comprises: the multimedia device, locating a pre-generated text summary associated with the program content but not provided with the program content; synthesizing the selected text summary into speech; generating a video summary of the audio-visual program content; mixing the synthesized speech with the video summary.

9. A method according to claim 8 wherein a text summary is selected according to predefined criteria from the located text summaries, should more than one summary have been located.

10. A method according to claim 8 wherein locating and/or selecting a pre-generated text summary is performed according to the user preferences.

11. A computer readable medium including code for automatically generating audio-visual summaries for audio-visual program content, said medium comprising:
code for locating a pre-generated text summary associated with the program content but not provided with the program content;
code for synthesizing the selected text summary into speech;
code for generating a video summary of the audio-visual program content; and
code for mixing the synthesized speech with the video summary.

* * * * *